2,901,475
Patented Aug. 25, 1959

2,901,475
CHEMOTHERAPEUTIC SALTS

Bernard Rudner and Albert Tockman, Baltimore, Md., assignors to W. R. Grace & Co., New York, N.Y., a corporation of Connecticut No Drawing. Application March 4, 1957
Serial No. 643,541

11 Claims. (Cl. 260—239.65)

This invention relates to salts containing a quaternized nitrogen which are chemotherapeutically active. In one specific aspect, it relates to hydrazinium salts of acid radicals containing the benzenesulfonamido radical or one of its derivatives.

Acidic sulfonamide derivatives have established utility in many fields. Saccharin, for example, is commercially the most important synthetic sweetner available. Other aromatic sulfonamides are useful dye intermediates (see British Patent 741,638, issued December 7, 1955). Sulfonyl urea derivatives have recently been introduced as anti-diabetic drugs. For example Orinase,

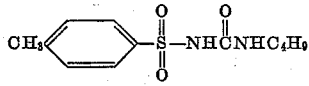

is effective for this purpose when administered orally.

Probably the most important of the acidic sulfonamides are the sulfa drugs, which are well known as chemotherapeutic agents. These compounds have been applied with remarkable success as a cure for such bacterial diseases as hemolytic streptococcal septicemia, streptococcal meningitis, streptococcal peritonitis, streptococcal pneumonia, erysipelas, meningicoccal meningitis, pneumoniacoccal pneumonia and gonococcal infections. They have been less effective, but still useful, for ulcerative colitis, pneumonicoccal meningitis, staphylococcal septicemia, gas gangrene, undulant fever, and chancroid. The best known sulfa drugs are the derivatives of sulfanilamide

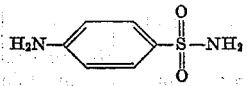

Commercially available derivatives of this useful compound include sulfathiazole, sulfapyridine, sulfadiazine, sulfapyrazine, sulfaquinoxaline, sulfamethazine, sulfacetimide, sulfathalidine, sulfasuxidine, and sulfamerazene.

The commercially important sulfa drugs are often employed in aqueous media, frequently in the form of their alkali metal or alkaline earth metal salts. This convenient and practical method of administering these compounds is subject to unfortunate limitations. It is well known that sodium salts of some sulfa drugs, e.g. of sulfapyridine, are too alkaline in solution to be completely satisfactory for injection, and too readily converted (even by the carbon dioxide of the air) to the more toxic free acid. Certain other chemotherapeutic salts are too soluble in the physiological fluids to permit the building up of satisfactory anti-bacterial concentrations in the body. We have found that new salts, having remarkable properties, are formed by replacing the alkali metal or alkaline earth metal ion with a hydrazinium cation. Our new salts, through the synergistic effect of the hydrazinium cation and the sulfonamide anion, overcome the above mentioned prior art limitations.

It is, therefore, an object of the present invention to provide a novel class of quaternized salts of sulfonamide or one of its derivatives, which are chemotherapeutically active.

The present invention comprises combining, by metathetical reaction, a hydrazinium cation and a sulfonamide anion. The metathesis, which will be discussed hereafter in further detail, is readily accomplished in anhydrous or aqueous solutions or by the fusion of two salts at relatively low temperatures. The new salts produced by this method and contemplated by the present invention comprise a hydrazinium cation of the surface active type and an anionic portion consisting of a chemotherapeutically active sulfonamide derivative. The hydrazinium cation can be effectively supplied from the appropriate hydrazinium chloride. Such salts are thoroughly described in a co-pending application S. N. 560,282, now abandoned, of B. Rudner, M. E. Brooks, and L. O. Young, filed January 20, 1956.

Using the aforementioned metathesis technique we have discovered a novel class of chemotherapeutic salts having a general formula:

$$[B]^+[A]^-$$

$[B]^+$ in the above formula is a surfactant hydrazinium cation having the structure:

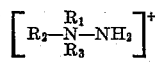

$R_1$ is acyclic residue having from 8 to 24 contiguous carbon atoms. Such a residue includes alkyl, alkenyl, alkadienyl, alkanoylamino, alkanoylaminoalkyl and alkanoyloxyalkyl groups.

$R_2$ is a member of the group consisting of alkyl radicals having up to 24 carbon atoms, alkenyl radicals having up to 24 carbon atoms, hydroxy lower alkyl, hydroxy lower alkoxy lower alkyl, hydroxy poly lower alkoxy lower alkyl, bis-hydroxyalkylaminoalkyl and carbon containing residues which when taken collectively with $R_3$ represent the necessary atoms to complete an annular structure having from 5 to 6 endocyclic atoms. $R_3$ may be taken collectively with $R_2$ as indicated to complete a heterocycle. For example if $R_2$ is $CH_2CH_2$—O and $R_3$ is $CH_2CH_2$, collectively they complete a morpholine structure. $R_3$ individually is a member selected from the group consisting of alkyl radicals having up to 24 carbon atoms, alkenyl radicals having up to 24 carbon atoms, hydroxy lower alkyl, hydroxy lower alkoxy lower alkyl, hydroxy poly lower alkoxy lower alkyl and bis-hydroxyalklyaminoalkyl.

$A^-$ in the above general formula is an anion derived from a benzene sulfonamide having the following structure:

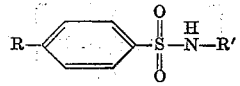

R in this structure represents hydrogen, lower alkyl, amino, or a group which is reducible or hydrolyzable to amino. Groups hydrolyzable to amino include acyl amino radicals, e.g. acetylamino, succinoylamino, butryrylamino and phthaloylamino; and aldehyde condensates, e.g. Schiff bases and aldehyde-bisulphite dehydration products. Groups reducible to amino are azo substituents, e.g. 2,4-diaminobenzeneazo, and hydrazo or hydrazino substituents. The negative charge of the benzenesulfonamido anion is generally on the $N_1$ nitrogen. The $N_1$ nitrogen is that atom adjacent to the sulphur atom in the aforesaid structure. When R is an amino or acyl amino group the nitrogen therein is usually differentiated from the sulfonamido nitrogen ($N_1$) by the designation $N_4$. When R is an acylamino radical of a disbasic acid, e.g. succinoyl amino or phthaloylamino, the negative charge of the anion is present on this group rather than the $N_1$ nitrogen. R' is a member selected from the group consisting of hydrogen, carbamoyl, lower alkanoyl and pseudoaryl nitrogeneous heterocycles. Such a nitrogeneous heterocycle is attached to the $N_1$ nitrogen through a carbon atom which is doubly bonded to a heterocyclic nitrogen. The term pseudoaryl nitrogeneous heterocycles embraces a group consisting of thiazoles, oxazoles, isoxazoles, pyrazoles, imidazoles, pyridines, diazines and their fused ring benzo derivatives. Each member of the above-named group may have attached to it a member of the group consisting of lower alkyl, alkoxy, carboxy, amino and alkylamino substituents in place of one of the hydrogen atoms attached to ring.

Since the properties of our novel salts depend upon the synergism between the cationic and anionic structure, it is especially appropriate that the possible variations of both anion and cation contemplated by our invention be throughly understood at this point.

First, with respect to the cationic structure, it is essential that the hydrazinium cation be of the surface active type. In general, the surface active type of hydrazinium salt comprises a molecule made up of a hydrophobic group such as derived from long chain alkyls (e.g. a carbon chain of 8–24 contiguous carbon atoms) and a water solublizing or hydrophilic group. The presence of such a cation in solution has the effect of lowering the interfacial tension at interfaces within the solution. Thus, when a solution of one of our novel salts is contacted with bacteria the surface tension at the liquid-solid interface is considerably reduced thereby permitting the solution containing the germ-killing sulfa drug to spread over and thoroughly wet the surface of the bacteria. Of even greater significance are the inherent antiseptic and penetrating properties of the hydrazinium cation. The ease of penetration of the bacterial cell generally reduces the relative concentration of chemotherapeutic salt necessary to kill bacteria. Furthermore, the surfactant hydrazinium cation tends to reduce the toxicity of the sulfonamide derivative, thereby making these important compounds available for applications where a mitigation of the toxicity is a basic requirement. Specific but non-limiting examples of suitable hydrazinium salts containing cations within the above described generic group are shown hereunder in Table I by name and formula.

TABLE I

Methyldihydrotallowhydrazinium chloride

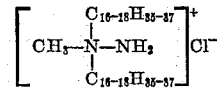

Dimethyl"soya"hydrazinium chloride

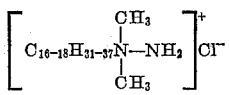

1,1 - dimethyl - 1 - [2 - (4 - octylphenoxyethoxy)ethyl]-hydrazinium chloride

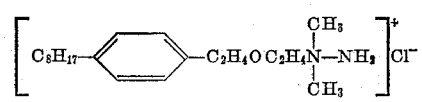

1,1 - bis - (2 - hydroxyethyl) - 1 - [3 - (N - β - hydroxyethyl) - N - octadecyl - aminopropyl - 1 - ]hydrazinium chloride

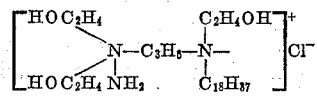

Dimethyloctadecylhydrazinium chloride

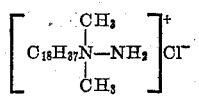

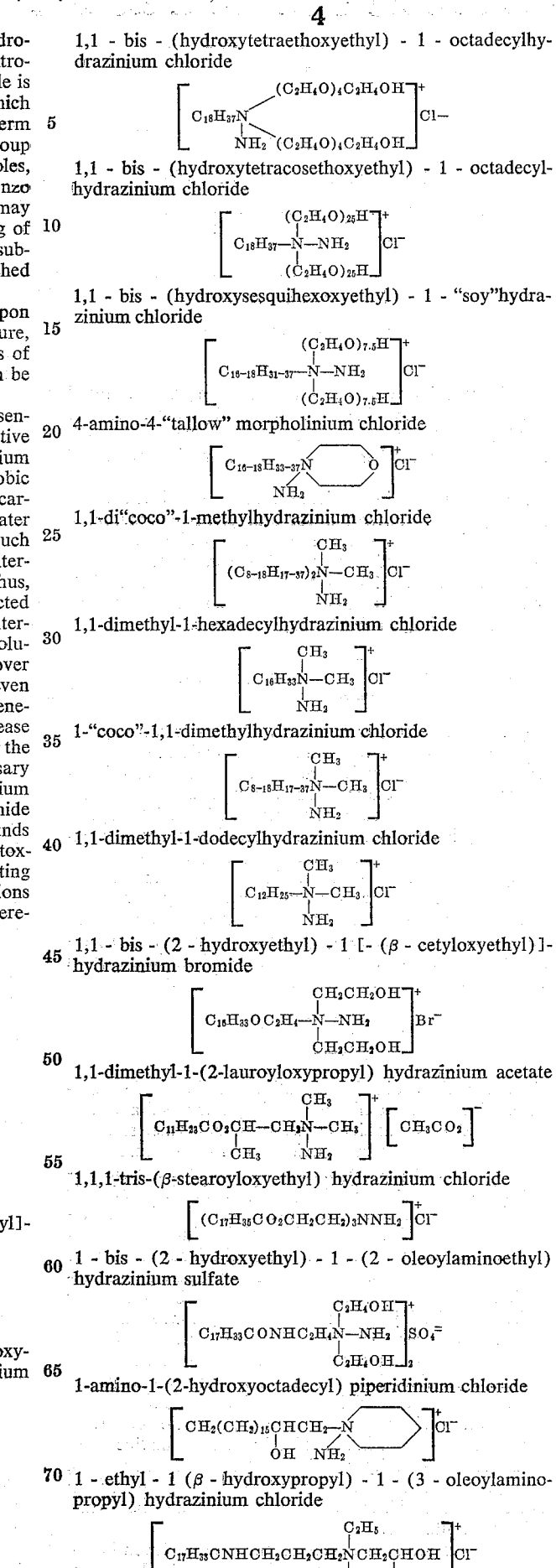

1-carboethoxymethyl-1,1-dicetylhydrazinium chloride

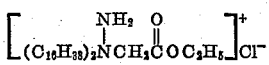

1,1 - bis - (2 - hydroxyethyl) - 1 - (2 - palmitoylamino-ethyl)hydrazinium chloride

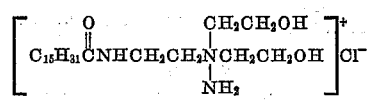

1 - (1 - carbobutoxy - 8 - hydroxyoctadecyl - 9) - 1,1 - dimethylhydrazinium chloride

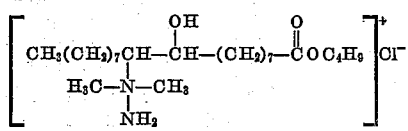

Second, the essential configuration of the anionic structure contained by my novel salts to render them therapeutically active has been set out above. The illustrations listed below in Table II will show the variety of suitably useful sulfonamides from which this structure can be derived.

TABLE II
*Useful acidic sulfonamides*

Benzenesulfonamide

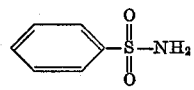

Benzenesulfonylurea

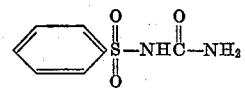

1-(p-ethylbenzenesulfonyl)-3-butylurea

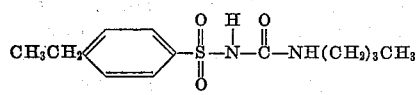

Sulfanilamide

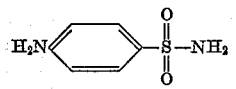

$N^4$-acetylsulfanilamide

Sulfacetimide

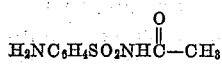

Irgamide $H_2NC_6H_4SO_2NHCOCH=C(CH_3)_2$

Prontosil

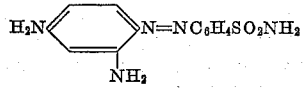

Sulphasolucin

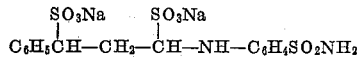

N-(4-toluenesulfonyl)benzamide $CH_3C_6H_4SO_2NHCOC_6H_5$

Sulfathiazole

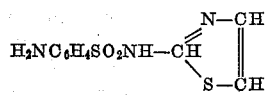

Gantrisin

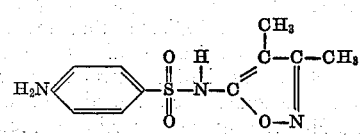

Sulfapyridine

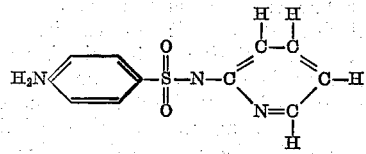

Sulfapyrazine

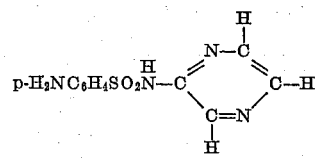

Sulfaquinoxaline

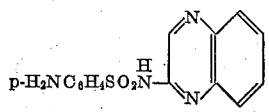

Sulfamethazine

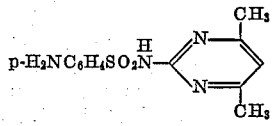

Sulfamerazine

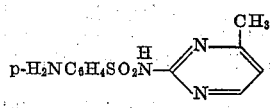

Diphthaloylsulfanilamide

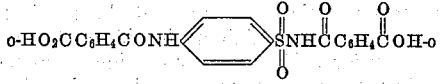

2-(4-benzylideneaminobenzenesulfonyl)aminopyridine

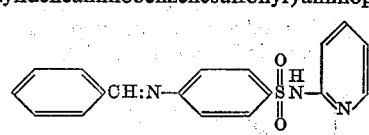

$N_4$ acetylsulfathiazole

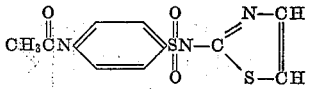

The $N_4$ or amino nitrogen has attached to it hydrogen atoms, or any group which by reduction or hydrolysis is converted to hydrogen atoms. This is especially important, for if the amino nitrogen is substituted with a group that cannot be removed in the body the activity is entirely lost.

We have already indicated that our novel chemotherapeutic salts are made by metathetical reaction. Tables I and II are specific indicia of suitable parent salts which may be selected for use in the formulation of our novel compounds. Generally speaking, the hydrazinium halides are the most readily available to supply the necessary surfactant hydrazinium cation. The hydrazinium chlorides may be prepared by reacting chloramine with the appropriate tertiary amine. Chloramine, of course, may be economically obtained in commercial quantities using the well known process of Harry H. Sisler et al., described in U.S. Patent No. 2,710,248, where chlorine and ammonia are reacted in a vapor phase to produce chloramine. Table I, supra, indicates that the appropriate hydrazinium acetate or sulfate is also suitable. In fact, other salts such as the iodide, nitrate, phosphate, carbonate, borate, benzoate, etc., can also be used if one wishes to modify the simpler reaction procedure. The sulfonamide derivative may be the free base itself, or an alkali or alkaline earth metal salt from the free base.

Our novel chemotherapeutic salts can be made in anhydrous or aqueous solution. The selection of reaction medium depends primarily on the solubility of the product. If the product is water-insoluble, we have found it convenient to prepare aqueous solutions of the parent hydrazinium salt and the parent sulfonamide derivative. When two such solutions are mixed the desired product readily precipitates out and can be easily separated by filtration. If, however, the product salt is water-soluble both the hydrazinium salt and the sulfonamide derivative can be dissolved in an unreactive organic solvent before adding them together. The term "unreactive" used to describe the solvent means such solvents which do not react preferentially with the product or the reactants. Solvents suitable for this purpose include such neutral liquids as hydrocarbons (e.g. hexane, cyclohexane and xylene); alcohols (e.g. methyl, ethyl, isopropyl, butyl, 2-ethoxy-ethyl, and ethylene glycol); ethers (e.g. diethyl ether, dioxane, tetrahydrofuran and tetrahydropyran; esters (e.g. ethyl acetate and triethyl phosphate); amides (e.g. dimethylformamide); nitriles (e.g. acetonitrile and benzonitrile); nitro compounds (e.g. 2-nitropropane and nitrobenzene); ketones (acetone, methyl isobutyl ketone and acetophenone); and halo compounds (chloroform, and bromobenzene). In general, use of a polar, water-miscible solvent, or water itself is advantageous. When anhydrous media are used the inorganic salt impurity precipitates from the reaction mixture and may be filtered off. The desired chemotherapeutic salt can then be separated from the filtrate by conventional laboratory procedures.

As an alternative procedure it is possible to fuse at low temperatures two anhydrous salts and then extract the product or impurities. Throughout the application we will refer to the hydrazinium chloride and the sodium salt of the sulfonamide compound as intermediates. This is done simply for the purposes of illustration since these are the most readily available parent salts. Obviously the same organic products may be prepared using other salts as shown below in Equations 1 and 2.

(1)

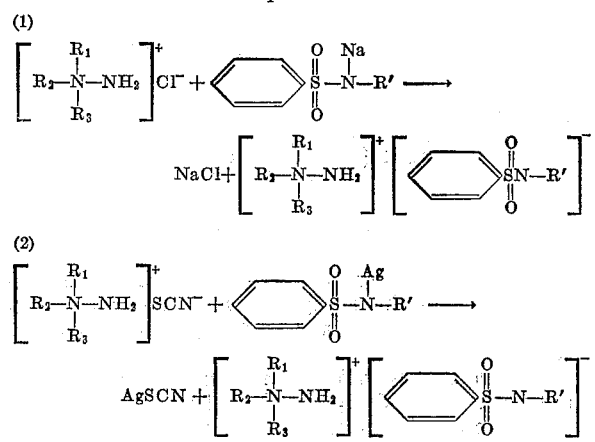

(2)

The advantages resulting from the synergistic combination of the surfactant hydrazinium cation with a sulfonamide compound also obtain with compounds comprising the cation of a surfactant hydrazinium salt and the anion of an acidic antibiotic. For example, surfactant hydrazinium salts of penicillin form stable aqueous dispersions suitable for injection or ingestion, self sterilizing by virtue of the hydrazinium anti-bactericidal properties, yet capable for maintaining effective concentrations in the bodily fluids. Salts of this type show advantage over the commercially useful amine salts of Penicillin G (e.g. the dibenzylethylenediamine salt). Replacement of the antibiotic moiety by other pharmaceutical residues, e.g. barbiturates, aspirin, and phenols, gives products with similar advantages.

Our invention is further illustrated by the following examples.

EXAMPLE I 50 g. of USP sodium sulfathiazole and 8 g. of sodium hydroxide were dissolved in 750 ml. of water. This solution was treated with 25 g. of dimethyloctadecylhydrazinium chloride. The hydrazinium salt floated on top. The reaction mixture was carefully layered with 100 ml. of acetone and then stirred rapidly for 30 minutes, thereby converting the two liquids to a liquid and a solid. The mixture was filtered and the solid obtained therefrom was washed with limited quantities of cold water. It was dried to yield 40 g. of a white powder which formed soapy emulsions in water. The powder was recrystallized 3 times from ethyl acetate to give 22 g. of glistening white plates; the novel chemotherapeutic salt, 1,1-dimethyl-1-octadecylhydrazinium salt of sulfathiazole:

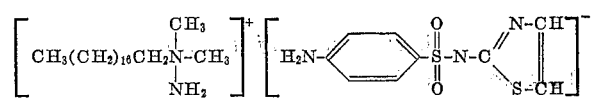

This new product shows a transition point and melts under pressure at 83° C. It is recrystallizable from water and soluble in chloroform and ethyl alcohol.

EXAMPLE II

The procedure of Example I was substantially repeated using 50 g. of sulfapyridine, 15 g. of sodium hydroxide in 750 ml. of water and 25 g. of dimethyloctadecylhydrazinium chloride. Recrystallization of the ultimate product gave very glossy matted plates which melted at 82° C. having properties similar to those of the sulfathiazole salt described in Example I. The structural formula of the novel product thus obtained is shown hereunder.

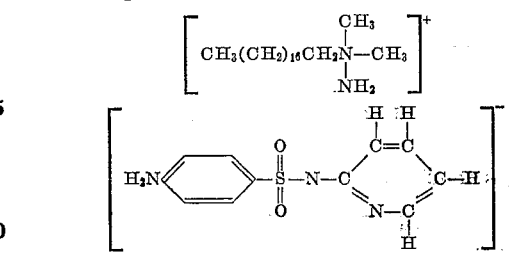

EXAMPLE III

Using a procedure similar to that described in the preceding examples, 85 g. of sulfapyridine and 30 g. of sodium hydroxide dissolved in 750 ml. of water were treated with 45 g. of methyldihydrotallowhydrazinium chloride. The solid product obtained from this reaction mixture was recrystallized twice from ethyl acetate to give 32 g. of a microcrystalline white powder that melted at 82° C. This new product was less soluble in cold water but more soluble in chloroform and dimethylketone than either the product of Example I or II. Its structural formula is shown below.

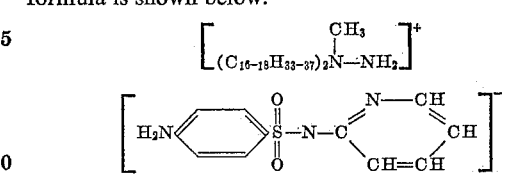

The tertiary amine used to prepare the parent hydrazinium chloride is claimed by its manufacturers to be a mixture containing approximately 90% tertiary amine, of which approximately 70% is methyldioctadecylamine, 23% methyldihexadecylamine, 5% trioctadecylamine, and 2% tris-hexadecylamine.

EXAMPLE IV

A 60 g. portion of sulfadiazine and 30 g. of sodium hydroxide were added to 750 ml. of water. This solution was treated with 35 g. of methyldihydrotallowhydrazinium chloride. The hydrazinium chloride was slurried in 150 ml. of hot dimethylketone and rapidly added to the sulfa solution with vigorous stirring. The solution was filtered and the solid obtained therefrom was recrystallized with hexane to give 17 g. of an amorphous white powder. The novel product was even more waxy than that of Example III. It showed a phase change at about 65° C. and melted clear at 100° C.

EXAMPLE V 40 g. of soydimethylhydrazinium chloride (a brown gum containing about 55% ammonium chloride) were slurried in 200 ml. of hot dimethylketone. This mixture was added rapidly with good stirring to 55 g. of sulfadiazine and 30 g. of sodium hydroxide dissolved in 750 ml. of water. The resulting solution was allowed to stand overnight to give a red oil with a density less than one. The mixture was frozen and the water was decanted therefrom. The oily product was resuspended in 200 ml. of water and extracted three times with equal volumes of chloroform. Chloroform extracts were dried over magnesium sulfate and added to an equal volume of $C_7H_{16}$. A red oil precipitated from the mixture and the solvents were decanted therefrom. The oil was evaporated to dryness to give a red gel. The gel was precipitated several times from ethyl acetate by treatment with n-heptane to give a gummy brown powder. This material was vacuum dried to give an off-white powder melting at about 86° C.

The parent "soy" amine from which the hydrazinium salt was made is claimed by its manufacturer to be a mixture of dimethylalkylamines in which alkyl is approximately 20% hexadecyl, 17% octadecyl, 26% octadecenyl, and 37% octadecadienyl on a weight percent basis. The white powder obtained as a product represents a more nearly saturated fraction than the dark brown oil obtained on evaporation of the purification mother liquors.

EXAMPLE VI 60 g. of 1,1-bis-(hydroxysesquihexoxyethyl)-1-soyhydrazinium chloride in 200 ml. of dimethylketone were added to 105 g. of sulfasuxidine in 750 ml. of water and 30 g. of sodium hydroxide. The clear solution thus obtained was allowed to evaporate spontaneously to form a yellow syrup. A portion of methyl alcohol corresponding to four times the volume of the syrup was added thereto. The gummy yellow precipitate thereby obtained was filtered off, washed with methanol, evaporated and vacuum dried to give the amorphous yellow sodium 1,1-bis-(hydroxypolyethoxyethyl)-1-soyhydrazinium salt of sulfasuxidine:

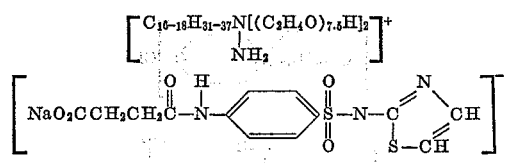

It is obvious that the above formula represents an average of the hydrazinium substituents since the "soy" portion contains a mixture of alkyl radicals indicated in Example V. The novel product softens at about 60° C. and melts at about 225° C. It undergoes partial decomposition at about 200° C. It is highly water-soluble and insoluble in chloroform and ethyl acetate.

EXAMPLE VII

A 5 g. portion of the product of Example VI was dissolved in 100 ml. of water and cautiously acidified with glacial acetic acid. The resulting mixture was cooled, filtered, dried and recrystallized to give a good yield of an amorphous white powder having one of the possible structures shown below:

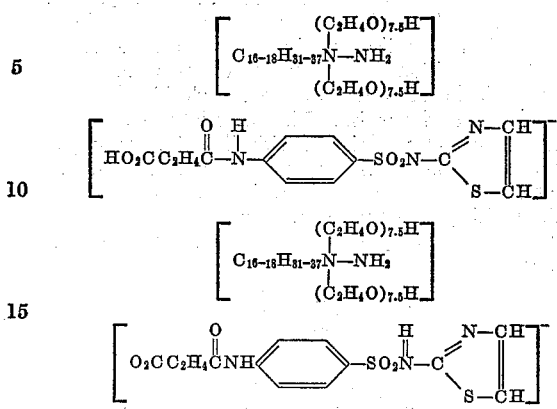

This novel compound shows a transition temperature at about 110° C. and melts at about 143–145° C. It is soluble in ethyl alcohol.

EXAMPLE VIII

Using a procedure substantially similar to that described in Example V, an aqueous solution containing 25 g. of sulfanilamide and 20 g. of sodium hydroxide was treated with 25 g. of 1,1-dimethyl-1-[2(4-octylphenoxyethoxy)ethyl]hydrazinium chloride slurried in hot dimethyl ketone. The mixture on standing overnight formed a red oil. It was chilled and the aqueous layer decanted therefrom. The red oil was dissolved in 200 ml. of water and clarified by decantation. It was added to an equal volume of dimethyl ketone to reprecipitate the oil. The resulting mixture was saturated with solid potassium carbonate, chilled, and the lower colorless aqueous layer was decanted therefrom. Evaporation of the dimethyl ketone layer (the upper red layer) gave 28 g. of a viscous red oil which was vacuum dried to a very viscous foaming red oil. The novel oil was readily water-soluble. Treatment with chloroform gave very fine silken needles which began to melt at about 60° C. and melted clear at 161–162° C. This novel chemotherapeutic salt has the formula:

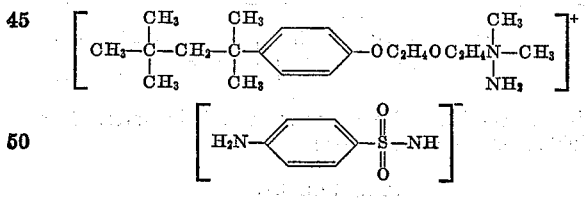

EXAMPLE IX 28 g. of sulfacetimide and 7½ g. of sodium hydroxide were dissolved in 500 ml. of water. This solution was treated with 28 g. of 1,1-dimethyl-1-(3-stearoylaminopropyl) hydrazinium chloride slurried in 100 ml. of methyl alcohol. The resulting clear solution was evaporated in an air stream (giving soapy foam), then filtered to give 4 g. of a hygroscopic white product. The new product showed transition and softening at about 45° C. and melted clear under pressure at about 68° C. Its formula is shown below:

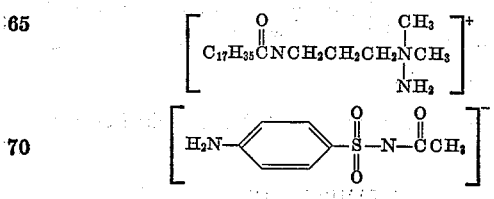

EXAMPLE X 80 g. of sulfaquinoxaline and 35 g. of sodium hydroxide were dissolved in 1000 ml. of water. This solution was treated with 40 g. of methyldi"coco"hydrazinium chloride in 100 ml. of acetone to give a thick slurry. The slurry was chilled and the water was decanted therefrom. The residual oil was dissolved in ethyl acetate and reprecipitated by addition of 2 volumes of n-hexane. The resultant oil, in acetone, gave, after clarification and evaporation, a dark varnish. This material was dissolved in chloroform and precipitated with diethyl ether to give a yellow oil. This material was dried under 3 mm. vacuum at 35° C. to give a gum which softened at about 50° C. (melting under pressure) and ran clear at about 103° C. The parent hydrazinium chloride has the general formula:

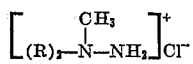

In the above formula R, being derived from coconut oil fatty acid, is according to its manufacturer a mixture of approximately 8% octyl, 9% decyl, 47% dodecyl, 8% hexadecyl, 5% octadecyl, 18% tetradecyl and 5% octadecenyl on a weight percent basis. The novel sulfaquinoxaline salt was less soluble in water than any of the products of the preceding examples.

EXAMPLE XI

The procedure of Example I was substantially repeated to give the sulfamerazine salt of methyldihydrotallowhydrazinium cation; a dry white powder softening at about 65° C. and melting at about 75° C.

EXAMPLE XII

A 0.01 mol portion of 4-amino-4-(3-oleoylaminopropyl) morpholinium chloride and an equal portion of benzenesulfonamide were fused at approximately 130° C. for 30 minutes. The cool brown residue was cautiously washed first with 5% cold potassium carbonate solution then with dimethyl ketone. The ultimate product was recrystallized from ethylacetate to give a fair yield of white prisms melting at about 106° C. The novel salt has the formula:

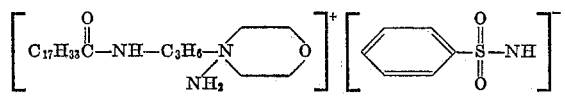

It is recrystallizable from, and forms gels in water. It is soluble in ethanol and acetone.

EXAMPLE XIII

Similar treatment of 1-p-tolysulfonylurea and 1-amino-1-(2-hydroxyethyl)-2-heptadecenylimidazolinium nitrate gave an oxidized mixture from which the novel chemotherapeutic salt could be tediously isolated. Using these same parent salts and substantially repeating the procedure of Example I gave, after recrystallization from an ethyl acetate-isopropyl alcohol mixture, a better yield of off-white microcrystalline product having the formula:

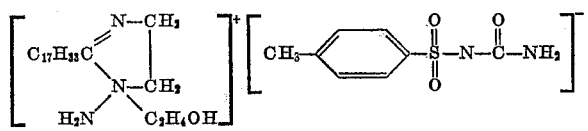

This novel salt softened at about 68° and melted clear at about 131° C.

EXAMPLE XIV

Equal portions (0.01 moles) of 1,1-bis-(2-hydroxyethyl)-1-[3-(N-β-hydroxyethyl-N-octadecyl)aminopropyl-1-]hydrazinium chloride and $N_4$-acetylsulfanilamide were refluxed in 100 ml. of isopropyl alcohol for 3 hours. The resulting mixture was evaporated dry on a steam bath and extracted with chloroform. Recrystallization from an ethyl acetate-benzene mixture gave thick tan noncrystallizing product having the structural formula:

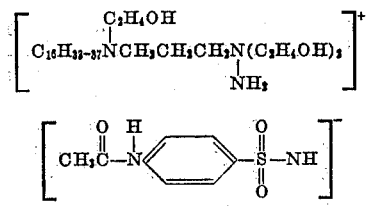

EXAMPLE XV

A hydrazinium chloride made by the chloramination of commercial amine known as "Ethomeen S/60" is a product of the average formula:

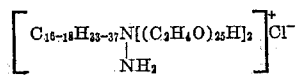

A 5% aqueous solution of this hydrazinium salt was treated with an excess of a 5% by weight aqueous solution of commercially available sodium sulfathiazole, U.S.P. XIV grade. The reaction mixture became slowly turbid and after 24 hours nearly quantitative precipitate was obtained therefrom. This material was recrystallized from water to give brilliant flat plates melting under pressure at about 142° C.

EXAMPLE XVI

A series of semi-micro tests were carried out to determine the nature of the products on a comparative basis using a variety of sulfonamido compounds and hydrazinium chlorides. The procedure for these tests was as follows: 5% aqueous solutions of the sodium salts of (1) sulfanilamide (2) sulfathalidine (3) sulfanilylurea and (4) sulfamethazine were prepared using 1.2 equivalents of sodium hydroxide to 1 equivalent of sulfa compound. 5% or saturated aqueous solutions of 4 hydrazinium chlorides having the average structural formula shown hereunder were prepared.

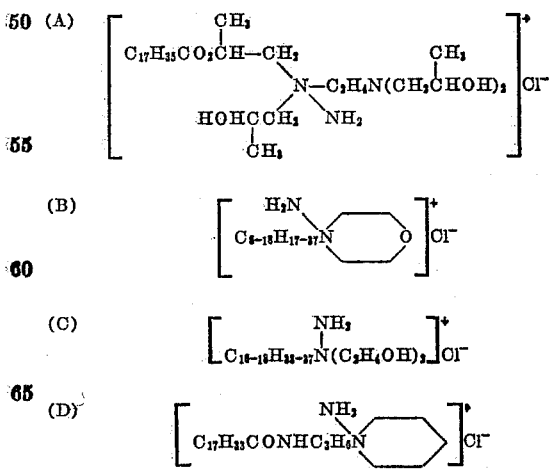

The sixteen experiments are summarized in Table III. Equal volumes of each solution were mixed together (the reaction mixture containing excess sulfa) and allowed to sit for 24 hours. After that time the mixtures were cautiously acidified with acetic acid. The initial result and the result on acidification are shown in Table III.

TABLE III
Sulfonamide compound

| Hydrazinium Salt | 1 | 2 | 3 | 4 |
|---|---|---|---|---|
| A | Slow gel going flocculent; no change with acid. | No ppt; gel with acid. | Slow ppt; more ppt. with acid. | Quick ppt; no change with acid. |
| B | No ppt; slow turbidity with acid. | Slow turbidity; ppt. with acid. | Slow ppt; more ppt. with acid. | Slow crystal formation; no change. |
| C | No ppt; no change. | Slow turbidity; no change. | Slow ppt; no change. | Slow crystal formation; no change. |
| D | No ppt; no ppt. | No ppt; sulfa pptd with acid. | No ppt; no ppt. | No ppt; no ppt. | ppt.=precipitate.

EXAMPLE XVII

A commercially available pharmaceutically approved solid mixture containing equal weights of sulfacetimide, sulfadiazine, and sulfamerazine was dissolved in 20 times its total weight of water by the careful addition of dilute sodium hydroxide. This solution was treated with one equivalent (to three of sulfa drugs) of 1,1-bis-(2-hydroxyethyl)-1-[3 - (N-β-hydroxyethyl-N-octadecyl)-aminopropyl-1-]hydrazinium chloride as a 10% aqueous solution. The mixture was evaporated to dryness in an air stream and extracted with isopropyl alcohol. An off-white product was obtained on evaporation of the solvent. It was a mixture of sodium and hydrazinium salts which, unlike the starting sulfa compounds, was dispersible in both water and peanut oil. The experiment was repeated using three times as much hydrazinium salt. The sodium content of the isopropyl alcohol soluble product was reduced to almost zero. The product obtained on evaporation of the solvent was soluble in water, chloroform and peanut oil.

Our novel products are exceedingly valuable in the formation of self-sterilizing, water and solvent soluble to dispersible medications. Furthermore, the synergistic combinations of surfactant hydrazinium cation and sulfonamido anion have the following remarkable properties. First, wetting, spreading, and penetrating ability. These attributes of our novel chemotherapeutic salts facilitate more effective inhibition or destruction. Second, anti-oxidant action. The surfactant hydrazinium cation is an effective anti-oxidant which protects the readily oxidizable sulfonamido portion of our novel salts. Third, dispersibility in both oil and water. This property insures effective contact with bacteria in both types of solution; a result which does not commonly obtain using $H_2O$ soluble bacteriocides. Fourth, self-sterilization, a desirable property not possessed by the parent chemotherapeutic sulfa drugs. Fifth, diminished alkalinity. The sodium salts of some of the parent sulfa drugs are too alkaline in solution and hence unsatisfactory for injection. Sixth, stability. Our novel compounds are not readily converted to the more toxic free acid.

The parent sulfa compounds show little in vitro activity. However, our novel chemotherapeutic salts are surprising from this standpoint. In a series of in vitro tests they showed excellent bacteriostatic properties when compared to the commercial drug Zephiran (refined benzalkonium chloride). They are also comparable or superior to phenol in their bacteriostatic and fungistatic activity. Tables IV, V and VI present cogent evidence of the effectiveness of our novel salts. Octadecyldimethylhydrazinium sulfathiazole was chosen as representative of our novel salts. Zephiran and phenol are common standards in bacteriostatic and fungistatic tests.

Table IV shows the bacteriostatic activity of one of our typical chemotherapeutic salts in comparison to Zephiran. Table V shows the bacteriostatic activity of the same salt when compared to phenol. Table VI shows fungistatic activity using phenol as a standard. The tables show inhibition of growth expressed in millimeters of representative bacteria and fungi by 0.1%, 0.01%, and 1% weight/volume neutral (pH 7) aqueous solutions of the chemotherapeutic salt. Zephiran and phenol, each at 0.01%, 0.1% and 1% weight/volume aqueous concentrations are shown as controls. The bacteria were routinely tested on nutrient agar or nutrient gelatin. The fungi were routinely tested on either Sabouraud's dextrose agar or potato agar. Each test was performed in duplicate on two different days. The average amount of inhibition, based on four individual measurements is presented. In the tables a small "p" next to the inhibition measurement indicates partial inhibition. Because of the nature of the Oxford cup technique, the results showing either complete or partial inhibition are roughly comparable.

TABLE IV
Bacteriostatic activity
[Octadecyldimethylhydrazinium sulfathizaole salt (1) v. Zephiran (2)]

| Concentration of Test Materials, Percent | Medium | Bacteria | | |
|---|---|---|---|---|
| | | Pseudomonas aeruginosa (1) v. (2) | Serratia marsecens (1) v. (2) | Klebsiella pneumoniae (1) v. (2) |
| 0.01 | Nutrient agar. | 10—10 | 14 p—10 | 10—11 |
| 0.1 | ---do--- | 16 p—10 | 20 p—13 | 18 p—17 |
| 1.0 | ---do--- | 23 p—15 | 25 p—17 | 22 p—21 |
| 0.01 | Nutrient gelatin. | 10—10 | | |
| 0.1 | ---do--- | 19—10 | | |
| 1.0 | Nutrient-- | 26—12 | | | p=partial inhibition.

TABLE V
Bacteriostatic activity
[Octadecyldimethylhydrazinium sulfathiazole salt (1) v. Phenol (2)]

| Concentration of Test Material, Percent | Medium | Bacteria | | | |
|---|---|---|---|---|---|
| | | Micrococcus pyogenes var. aureus | Serratia marsecens | Pseudomonas aeruginosa | Klebsiella pneumoniae |
| 0.01 | Nutrient agar | 12 p—10 | 14 p—10 | 10—10 p | 10—10 |
| 0.1 | ---do--- | 14 p—10 | 20 p—10 | 16 p—10 p | 18 p—10 |
| 1.0 | ---do--- | 18 p—15 | 25 p—23 | 23 p—20 p | 22 p—23 |
| 0.01 | Nutrient gelatin | | | 10—10 | |
| 0.1 | ---do--- | | | 19—10 | |
| 1.0 | ---do--- | | | 26—22 | | p—partial inhibition.

TABLE VI

Fungistatic activty

[Octadecyldimethylhydrazinium sulfathiazole salt (1) v. Phenol (2)]

| Concentration of Test Material, Percent | Medium | Fungi | |
|---|---|---|---|
| | | Candida Albicans | Chaetomium Globosum |
| 0.01 | Sabouraud's dextrose agar | 10—10 | |
| 0.1 | | 10—10 | |
| 1.0 | | 10—23 | |
| 0.01 | potato agar | | 8—3 |
| 0.1 | | | 10—5 |
| 1.0 | | | 12—58 |

We claim:

1. As a new chemical compound, the 1,1-dimethyl-1-octadecylhydrazinium salt of sulfathiazole.

2. As a new chemical compound, the 1,1-dimethyl-1-(3-stearoylaminopropyl) hydrazinium salt of sulfacetimide.

3. As a new chemical compound, the 4-amino-4-cocomorpholinium salt of sulfanilamide.

4. As a new chemical compound the 1,1-bis(hydroxyethyl)-1-soyhydrazinium salt of p-toluenesulfonylurea.

5. As a new chemical compound the 1,1-bis-(hydroxysesquihexoxyethyl)-1-soyhydrazinium salt of sulfasoxidine.

6. New chemotherapeutic salts having the following structure:

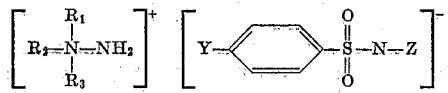

wherein $R_1$ is a member selected from the group consisting of acyclic alkyl and alkenyl hydrocarbon radicals having 8 to 24 carbon atoms, acyclic alkylcarbonylaminoloweralkyl radicals containing a total of from 8 to 24 carbon atoms, acyclic alkylcarbonyloxyloweralkyl radicals containing a total of from 8 to 24 carbon atoms and acyclic alkylcarbonyloxyloweralkylaminoloweralkyl radicals containing a total of from 8 to 24 carbon atoms; $R_2$ and $R_3$ taken separately are members selected from the group consisting of acyclic alkyl and alkenyl hydrocarbon radicals containing 1 to 25 carbon atoms, hydroxyloweralkyl and hydroxypolyloweralkoxyloweralkyl; $R_2$ and $R_3$ taken together with the N on which they are both substituents form a ring system selected from the group consisting of morpholine, piperidine and pyrrolidine; Y is a member selected from the group consisting of hydrogen, lower alkyl, amino, lower alkylcarbonylamine, succinoyl, benzalkylideneimine, benzeneazo, benzenehydrazo and benzenehydrazino; Z is a member selected from the group consisting of hydrogen, carbamoyl, lower alkanoyl, oxazole, isoxazole, thiazole, pyridine, pyrimidine, pyrazine, quinoline, quinoxaline, loweralkyloxazole, loweralkylisoxazole, loweralkylthiazole, loweralkylpyridine, loweralkylpyrimidine, loweralkylpyrazine, loweralkylquinoline and loweralkylquinoxaline.

7. Compounds according to claim 6 wherein $R_1$ is an acyclic alkyl hydrocarbon radical having 8 to 24 carbon atoms, $R_2$ and $R_3$ are acyclic alkyl hydrocarbon radicals containing 1 to 25 carbon atoms, Y is amino and Z is thiazole.

8. Compounds according to claim 6 wherein $R_1$ is an acyclic alkylcarbonylaminoloweralkyl radical, $R_2$ and $R_3$ are acyclic alkyl hydrocarbon radicals containing 1 to 25 carbon atoms, Y is amino and Z is lower alkanoyl.

9. Compounds according to claim 6 wherein $R_1$ is an acyclic alkyl hydrocarbon radical having 8 to 24 carbon atoms, $R_2$ and $R_3$ together with the N on which they are both substituents form the morpholine ring, Y is amino and Z is hydrogen.

10. Compounds according to claim 6 wherein $R_1$ is an acyclic alkenyl hydrocarbon radical having 8 to 24 carbon atoms, $R_2$ and $R_3$ are hydroxyloweralkyl, Y is lower alkyl and Z is carbamoyl.

11. Compounds according to claim 6 wherein $R_1$ is an acyclic alkenyl hydrocarbon radical having 8 to 24 carbon atoms, $R_2$ and $R_3$ are hydroxypolyloweralkoxyloweralkyl, Y is succinoyl and Z is thiazole.

No references cited.